United States Patent
Hartmann et al.

(10) Patent No.: US 7,634,940 B2
(45) Date of Patent: Dec. 22, 2009

(54) DEVICE AND METHOD FOR MONITORING THE INTAKE MANIFOLD PRESSURE OF AN INTERNAL COMBUSTION ENGINE

(75) Inventors: Dirk Hartmann, Stuttgart (DE); Georg Mallebrein, Korntal-Muenchingen (DE); Werner Mezger, Eberstadt (DE); Henri Barbier, Schwieberdingen (DE); Soenke Mannal, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 12/077,539

(22) Filed: Mar. 19, 2008

(65) Prior Publication Data
US 2008/0236267 A1    Oct. 2, 2008

(30) Foreign Application Priority Data
Mar. 20, 2007    (DE) ............... 10 2007 013 252

(51) Int. Cl.
*G01M 15/09*    (2006.01)
(52) U.S. Cl. ............... 73/114.37; 73/114.79
(58) Field of Classification Search ......... 73/114.37, 73/114.79
See application file for complete search history.

(56) References Cited

U.S. PATENT DOCUMENTS

| | | | |
|---|---|---|---|
| 6,481,269 B2 * | 11/2002 | Maruta et al. | 73/114.63 |
| 6,752,128 B2 * | 6/2004 | Ozeki et al. | 123/479 |
| 6,945,224 B2 * | 9/2005 | Yoshizawa et al. | 123/346 |
| 6,948,358 B2 * | 9/2005 | Weiss et al. | 73/114.79 |
| 7,017,551 B2 * | 3/2006 | Shimizu | 123/399 |
| 7,047,924 B1 * | 5/2006 | Waters et al. | 123/90.16 |
| 7,069,142 B2 * | 6/2006 | Keller et al. | 701/114 |
| 7,080,547 B2 * | 7/2006 | Beyer et al. | 73/114.37 |
| 7,100,586 B2 * | 9/2006 | Matsumoto | 123/568.16 |
| 7,143,726 B2 * | 12/2006 | Gaessler et al. | 123/90.15 |
| 7,269,501 B2 * | 9/2007 | Melzig et al. | 701/114 |
| 2004/0003656 A1 * | 1/2004 | Ishiguro et al. | 73/118.1 |
| 2004/0231640 A1 * | 11/2004 | Iwasaki et al. | 123/396 |
| 2005/0166895 A1 * | 8/2005 | Yoshizawa et al. | 123/346 |
| 2008/0052042 A1 * | 2/2008 | McLain et al. | 702/185 |

* cited by examiner

*Primary Examiner*—Lisa M Caputo
*Assistant Examiner*—Freddie Kirkland, III
(74) *Attorney, Agent, or Firm*—Kenyon & Kenyon LLP

(57) ABSTRACT

A method and a device for monitoring the intake manifold pressure of an internal combustion engine in which a measured signal for the intake manifold pressure is compared with a reference signal for the intake manifold pressure. For a deviation of the measured signal for the intake manifold pressure from the reference signal for the intake manifold pressure, a tolerance range is predefined for error-free operation of the intake and/or exhaust valves of at least one cylinder of the internal combustion engine. A check is made whether the measured signal for the intake manifold pressure deviates from the reference signal for the intake manifold pressure by more than a predefined tolerance range. In this case an erroneous operation of the intake and/or exhaust valves is detected; otherwise an error-free operation of the intake and/or exhaust valves is detected.

23 Claims, 3 Drawing Sheets

DEVICE AND METHOD FOR MONITORING THE INTAKE MANIFOLD PRESSURE OF AN INTERNAL COMBUSTION ENGINE

CROSS-REFERENCE

This application claims the benefit under 35 U.S.C. §119 of German Application No. 102007013252.4 filed on Mar. 20, 2007, which is expressly incorporated herein by reference in its entirety.

FIELD OF THE INVENTION

The present invention relates to a method and a device for monitoring the intake manifold pressure of an internal combustion engine.

BACKGROUND INFORMATION

German Patent Application No. DE 103 00 593 A1 describes a method and a device for operating an internal combustion engine in which the intake manifold pressure of the internal combustion engine is monitored in such a way that in at least one operating state of the internal combustion engine when the exhaust gas recirculation is activated, a first intake manifold pressure in a first position of at least one control element in the exhaust tract and a second intake manifold pressure in a second position of the at least one control element in the exhaust tract are ascertained. The function of the at least one control element in the exhaust tract is monitored as a function of a difference between the first and the second intake manifold pressure.

SUMMARY

An example method according to the present invention and an example device according to the present invention for monitoring the intake manifold pressure of an internal combustion engine may have the advantage that in the event of a deviation of the measured signal for the intake manifold pressure from the reference signal for the intake manifold pressure, a tolerance range for error-free operation of the intake and/or exhaust valves of at least one cylinder of the internal combustion engine is predefined, a check is made on whether the measured signal for the intake manifold pressure deviates from the reference signal for the intake manifold pressure by more than the predefined tolerance range, in which case an erroneous operation of the intake and/or exhaust valves is detected, and otherwise an error-free operation of the intake and/or exhaust valves is detected. In this way, a diagnosis of the operation of the intake and/or exhaust valves of at least one cylinder of the internal combustion engine is possible by monitoring the intake manifold pressure. Such an erroneous operation of the intake and/or exhaust valves of the at least one cylinder may result because of at least one erroneously operating adjustment device for the intake and/or exhaust valves.

The functionality of monitoring the intake manifold pressure of the internal combustion engine may thus be extended and may thus also be used for detecting an erroneous operation of the intake and/or exhaust valves of at least one cylinder of the internal combustion engine.

Particularly reliable monitoring of the intake manifold pressure and the detection of an erroneous operation of the intake and/or exhaust valves results if a signal for the intake manifold pressure is ascertained, in particular modeled, as a reference signal for the intake manifold pressure, which is established during steady-state operation of the internal combustion engine, in particular at constant load and constant rotational speed.

If the reference signal for the intake manifold pressure is ascertained during steady-state operation of the internal combustion engine and the measured signal for the intake manifold pressure is compared to the reference signal for the intake manifold pressure for the predefined tolerance range in this steady-state operation of the internal combustion engine, an appropriately rapid evaluation of the operation of the intake and/or exhaust valves for errors may be performed due to the short transient condition of the reference signal at constant operating conditions of the steady-state operation of the internal combustion engine.

Another advantage results if, when ascertaining the reference signal, the intake valves of all cylinders of the internal combustion engine are operated with the same lift and the same phase, and the exhaust valves of all cylinders of the internal combustion engine are operated with the same lift and the same phase. In this way, the intake valves and the exhaust valves operate symmetrically, and each cylinder of the internal combustion engine has approximately the same behavior regarding the operation of its intake and/or exhaust valves as the other cylinders, so that a uniform evaluation for the presence of errors in the operation of their intake and/or exhaust valves is made possible.

It is furthermore advantageous if the comparison of the measured signal for the intake manifold pressure with the reference signal for the intake manifold pressure is performed individually for each cylinder. In this way, an erroneous operation of the intake and/or exhaust valves or an error-free operation of the intake and/or exhaust valves of the cylinders may be implemented individually, i.e., for each cylinder.

It is furthermore advantageous if the comparison of the measured signal for the intake manifold pressure with the reference signal for the intake manifold pressure for a cylinder is allowed only at predefined, angle-synchronous points in time, which permit assigning the signal value of the reference signal to the corresponding cylinder. In this way, the cylinder-individual evaluation for an erroneous or error-free operation of the intake and/or exhaust valves is made possible, and signal components of the reference signal and/or of the measured signal for the intake manifold pressure originating from the different cylinders are effectively prevented from mutually influencing each other when the intake and/or exhaust valves of a certain cylinder are evaluated for errors during operation. It is thus ensured that the comparison of the measured signal for the intake manifold pressure with the reference signal for the intake manifold pressure may reliably be performed individually for each cylinder.

Another advantage results if an erroneous operation of the intake and/or exhaust valves of at least one cylinder is detected, if the measured signal for the intake manifold pressure exceeds the reference signal for the intake manifold pressure with respect to the at least one cylinder by more than a predefined value as a function of the predefined tolerance range, in particular for at least a predefined time period. In this way, the evaluation for erroneous or error-free operation of the intake and/or exhaust valves of the at least one cylinder is particularly easy. If the erroneous operation of the intake and/or exhaust valves of the at least one cylinder is detected only if the measured signal for the intake manifold pressure exceeds the reference signal for the intake manifold pressure with respect to the at least one cylinder by more than a predefined value as a function of the predefined tolerance range, in particular for the at least one predefined time period, the evaluation for the presence of an erroneous or error-free operation of the intake and/or exhaust valves is still particularly reliable and may not be affected by transient interference signals which have an effect for less than the predefined time period.

Another advantage results if an erroneous operation of the intake and/or exhaust valves of at least one cylinder is detected if the measured signal for the intake manifold pressure is outside a tolerance band formed as a function of the predefined tolerance range around the reference signal for the intake manifold pressure with respect to the at least one cylinder, in particular for at least a predefined time period. Due to the check performed in this case on both sides of the reference signal, a more precise statement regarding the type of the existing defect in the operation of the intake and/or exhaust valves may be made. This statement is particularly reliable if an erroneous operation of the intake and/or exhaust valves of the at least one cylinder is detected only if, for at least the predefined time period, the measured signal for the intake manifold pressure is outside a tolerance band formed as a function of the predefined tolerance range around the reference signal for the intake manifold pressure with respect to the at least one cylinder. In this case, the diagnosis of the operation of the intake and/or exhaust valves may not be distorted by a short-term interference signal which has an effect on the comparison of the measured signal with the reference signal for the intake manifold pressure for less than the predefined time period.

It is furthermore advantageous that, in the case where the measured signal for the intake manifold pressure deviates from the reference signal for the intake manifold pressure by more than the predefined tolerance range for less than a predefined time period, an erroneous operation of the intake and/or exhaust valves of the at least one cylinder is detected only if such a deviation is detected repeatedly with respect to the at least one cylinder. In this way, error phenomena in the operation of the intake and/or exhaust valves whose effect on the measured signal for the intake manifold pressure changes over time may also be recognized, i.e., when a deviation with respect to the reference signal by more than the predefined tolerance range exists for less than the predefined time period and subsequently decays again, but the error persists. This permits the measured signal for the intake manifold pressure to be investigated for cyclically decaying error phenomena and such error phenomena to be recognized. In this way, an error in the operation of the intake and/or exhaust valves may be recognized, which, due to its short-term effect on the measured signal for the intake manifold pressure for less than the predefined time period, would not be otherwise distinguishable from an arbitrary interference, for example, due to electrical interference with the measured signal for the intake manifold pressure.

Another advantage results if the reference signal is modeled on the basis of a container model which determines the variation of an intake manifold pressure over time on the basis of mass flows entering the intake manifold via an air supply and exiting the intake manifold into the at least one cylinder, in particular by taking into account intake manifold pressure fluctuations due to suction of the at least one cylinder. This permits the reference signal and thus the expected reference behavior to be ascertained in a particularly easy manner; the modeling may be refined and made more precise if the intake manifold pressure fluctuations due to the suction of the at least one cylinder are taken into account when modeling the reference signal.

BRIEF DESCRIPTION OF THE DRAWINGS

An exemplary embodiment of the present invention is depicted in the figures and explained in greater detail below.

DETAILED DESCRIPTION OF EXAMPLE EMBODIMENTS

Figure 1:
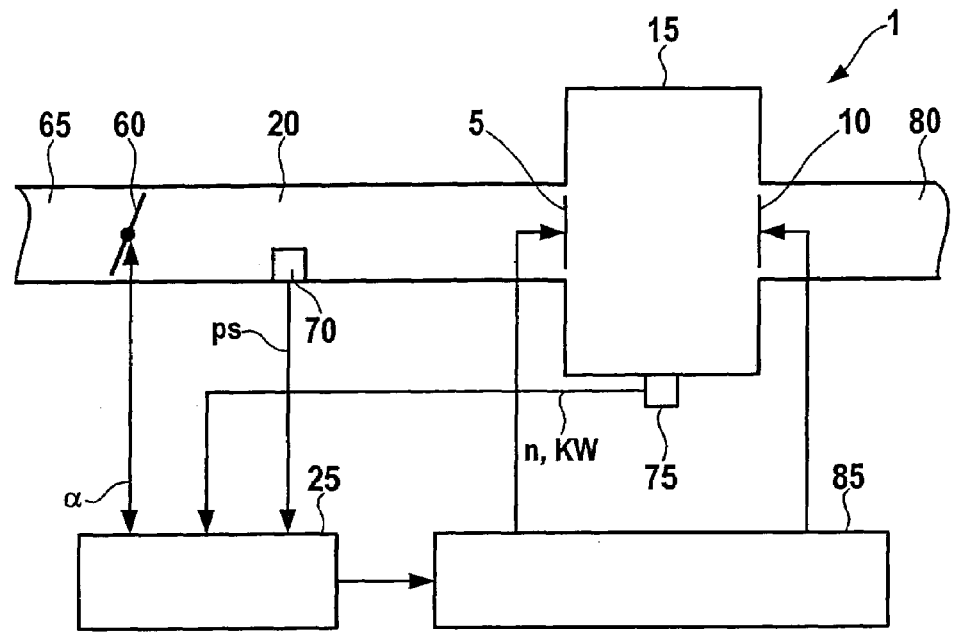
FIG. 1 shows a schematic view of an internal combustion engine.

FIG. 1 shows an internal combustion engine 1, which may be designed as a gasoline engine or a diesel engine, for example. In the following it will be assumed, for example, that internal combustion engine 1 is designed as a gasoline engine. Internal combustion engine 1 includes one or more cylinders 15, only one of which is shown in FIG. 1 as an example. Air is supplied to a combustion chamber of cylinder 15 from an intake manifold 20 via one or more intake valves 5. Fuel is also supplied to the combustion chamber, the air/fuel mixture being ignited in the combustion chamber of cylinder 15 by a spark plug. The exhaust gas formed by the combustion of the air/fuel mixture is expelled into an exhaust tract 80 via one or more exhaust valves 10. Fresh air is supplied into intake manifold 20 via an air supply 65 and a throttle valve 60. Intake manifold pressure ps is detected with the aid of an intake manifold pressure sensor 70 in intake manifold 20. The signal, measured with the aid of intake manifold pressure sensor 70 or the measuring signal for the intake manifold pressure, is supplied to an engine controller 25. This measured signal for intake manifold pressure ps is a signal that is continuous over time. A rotational speed sensor 75, which measures engine speed n of internal combustion engine 1 and also relays it in the form of a signal that is continuous over time to engine controller 25, is situated in the area of cylinder 15. The position of throttle valve 60 is ascertained by a position sensor (not depicted in FIG. 1) and relayed to engine controller 25 in the form of a measuring signal which is also continuous over time. The position of throttle valve 60 is labeled a in FIG. 1. Conversely, throttle valve 60 is controlled by engine controller 25, for example, as a function of the operation of an accelerator pedal in such a way that a desired air mass flow results. FIG. 1 also shows a valve adjustment device 85, which adjusts the lift and the phase of intake valve(s) 5 and of exhaust valve(s) 10 according to the specifications of engine controller 25. Valve adjustment device 85 may be an electrohydraulic valve adjustment device or an electromagnetic valve adjustment device and makes a fully variable valve operation possible, i.e., a fully variable adjustment of the valve opening times, i.e., of the valve phase. Valve adjustment device 85 also makes it possible to deactivate the intake and exhaust valves of one or more individual cylinders of internal combustion engine 1 as a function of an appropriate control by engine controller 25, for example for operating internal combustion engine 1 in a half-engine mode, in which one-half of the cylinders of internal combustion engine 1 are deactivated regarding their intake and exhaust valves. The intake and exhaust valves of the deactivated cylinders are permanently closed during the half-engine operation. On the other hand, the cylinders activated with regard to the intake and exhaust valves have cylinder cycle-specific valve opening times so that these activated cylinders may be operated in a conventional manner in the individual cylinder cycles.

The valve lift of the intake and/or exhaust valves of one or more cylinders may also be variably adjusted if necessary within a mechanically predefined or electronically defined adjustment range due to valve adjustment device 85. Due to the variable valve control with the aid of valve adjustment device 85, the valve control may be made more flexible compared to the conventional camshaft-based valve adjustment.

The subject matter of the present invention is the monitoring of the correct operation of intake and/or exhaust valves 5, 10 and thus also the correct operation of valve adjustment device 85.

In this way, reliable operation of intake and/or exhaust valves 5, 10 and of valve adjustment device 85, from the point of view of component protection, is made possible. In addition, legal requirements in effect for the diagnosis of such components may be met.

Figure 4:
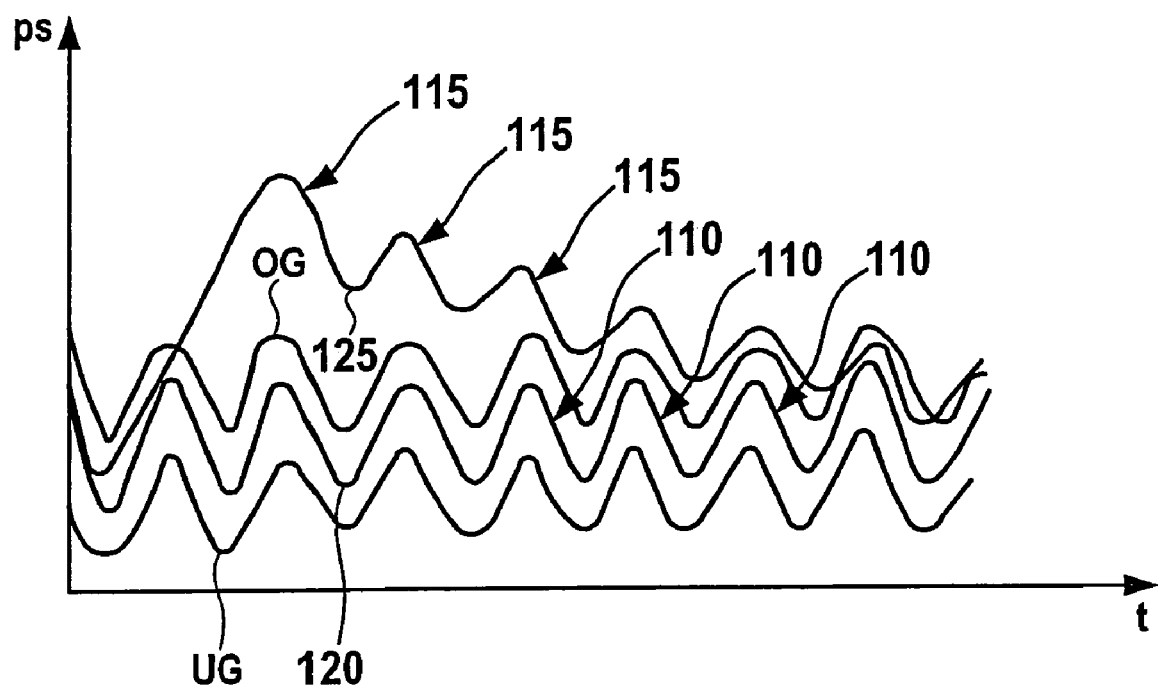
FIG. 4 shows a variation of a reference signal for the intake manifold pressure over time, and a variation of a measured signal for the intake manifold pressure over time.

According to an example embodiment of the present invention, the operation of intake and/or exhaust valves 5, 10 and thus also the reliability performance of valve adjustment device 85 is diagnosed by monitoring the intake manifold pressure. For this purpose, a reference signal is formed for the intake manifold pressure, which represents the variation over time of the intake manifold pressure in steady-state engine operation when intake and/or exhaust valves operate error-free and therefore also valve adjustment device 85 operates error-free. This variation over time is labeled with reference numeral 120 in FIG. 4. After a short transient operation starting when steady-state operating state of internal combustion engine 1 exists, the depicted boundary oscillations are established. Accordingly, the reference signal for diagnosing the operation of intake and/or exhaust valves 5, 10 may be extracted in a timely manner. The steady-state engine operation is characterized, for example, by a constant engine speed n and a constant load represented, for example, by a constant position α of throttle valve 60. The cyclical and symmetrical boundary oscillations of the reference signal depicted in FIG. 4 are established when the intake valves of all cylinders of the internal combustion engine are operated with the same lift and the same phase and also the exhaust valves of all cylinders of internal combustion engine 1 are operated with the same lift and the same phase, i.e., the intake valves and the exhaust valves of all cylinders operate symmetrically, so that each cylinder has approximately the same behavior with respect to the associated intake and exhaust valves, and the operating conditions of the internal combustion engine, in particular with regard to the load and the rotational speed, do not change, as described above. Reference numeral 110 denotes, for example, individual wave peaks of reference signal 120, which represent the influence of an individual cylinder of the internal combustion engine on the intake manifold pressure in error-free operation of the intake and exhaust valves associated with the corresponding cylinder.

In erroneous operation of the intake and exhaust valves of one or more cylinders of internal combustion engine 1, for example, due to an erroneously operating valve adjustment device 85, which in this case does not operate or operates only to a limited extent, a distorted signal results for the intake manifold pressure, which is depicted in FIG. 4 as an example with reference numeral 125. The pressure increase of distorted signal 125 depicted there is based, depending on the type of error, on different effects, for example the lack or partial lack of suction of one or more cylinders of internal combustion engine 1, the back-up of uncombusted air from one or more cylinders into the intake manifold or back-up of combusted air from a cylinder into intake manifold 20. In each of these cases, at least the intake valve(s) of the corresponding cylinder are operated erroneously, for example they erroneously jam open. Depending on the type of error, pressure differences of different magnitudes with respect to reference signal 120 result. FIG. 4 also shows the influence of the suction of individual cylinders on the intake manifold pressure for distorted signal 125, with the aid of reference numeral 115.

According to the present invention, it is provided to monitor the measured signal of the intake manifold pressure with the aid of the ascertained reference signal and by comparing the measured signal with the reference signal to check for the exit of the predefined tolerance range, which is predefined for error-free operation of intake and/or exhaust valves 5, 10 of the at least one cylinder 15 of internal combustion engine 1, and to detect erroneous operation of intake and/or exhaust valves 5, 10, in particular due to erroneous operation of valve adjustment device 85.

Figure 2:
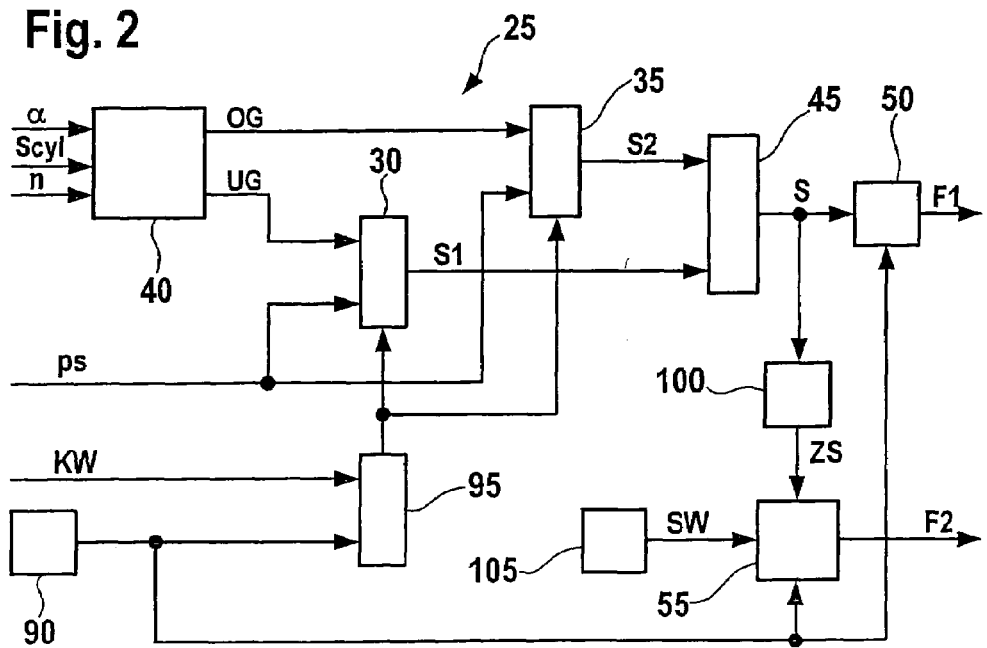
FIG. 2 shows a function diagram for explaining a method according to an example embodiment of the present invention and the device according to an example embodiment of the present invention.

The example method and the example device according to the present invention are elucidated below with reference to the function diagram of FIG. 2; this function diagram may be implemented as software and/or hardware in engine controller 25. Engine controller 25 thus includes a selection unit 40, for example in the form of a mathematical model or a characteristics map, which receives the time-continuous signals for throttle valve angle α from the corresponding position sensor and for engine speed n from rotational speed sensor 75 as input variables. Furthermore, a signal Scycl which indicates which cylinders are possibly deactivated is supplied to selection unit 40. This signal may be ascertained within engine controller 25 in a conventional manner from the instantaneous engine speed and the instantaneous engine torque, for example, to select which cylinders should be deactivated in the case of a half-engine operation to be set. Therefore, this signal is also transmitted from engine controller 25 to valve adjustment device 85. If necessary, further input signals, which have an influence on the formation of reference signal 120, may be supplied to selection unit 40. In the case where selection unit 40 is designed as a mathematical model, it may be designed as a one-dimensional container model, which represents the variation over time of the intake manifold pressure on the basis of the mass flows flowing into intake manifold 20 via air supply 65 and from intake manifold 20 into the at least one cylinder 15 at the instantaneous load in the form of instantaneous throttle valve angle α, instantaneous engine speed n, and for the currently deactivated cylinders according to signal Scyl.

This model may be refined by taking into account the pressure fluctuations in intake manifold 20 caused by the suction of the individual cylinders. Thus, the variation over time of the reference signal according to reference numeral 120 as a function of the above-named input variables is obtained as a result of the modeling. Furthermore, considering the input variables of the model or the selection unit, in particular throttle valve angle α and engine speed n as variables subject to tolerances, a predefined tolerance range around the ascertained reference signal 120, which forms a tolerance band around reference signal 120, may be ascertained therefrom. This tolerance band is delimited downward by a minimum modeled variation of intake manifold pressure over time UG and upward by a maximum modeled variation of intake manifold pressure over time OG. Minimum modeled variation of intake manifold pressure over time UG and maximum modeled variation of intake manifold pressure over time OG are also depicted in FIG. 4. Selection unit 40 now outputs minimum modeled variation of intake manifold pressure over time UG and maximum modeled variation of intake manifold pressure over time OG as output variables. Using this model for the reference signal, i.e., the tolerance band around reference signal 120, an expected reference behavior now exists, which may now be compared with the measured signal for intake manifold pressure ps.

The comparison to be performed for diagnostic purposes between the measured signal for intake manifold pressure ps and expected reference signal 120, taking into account the predefined tolerance band, i.e., the evaluation of the comparison result, is strongly dependent on the requirements of the system at hand. Different options for implementation exist, which may be implemented together with the aid of the function diagram of FIG. 2, either individually or in any combination with each other.

The minimum modeled variation of intake manifold pressure over time UG is supplied to a first comparator unit 30, which also receives the measured signal for intake manifold pressure ps. First comparator unit 30 compares the minimum modeled variation of intake manifold pressure over time UG with the measured signal for intake manifold pressure ps and outputs, at its output, a first set signal S1, which is set as long as the measured signal for intake manifold pressure ps is less than minimum modeled variation of intake manifold pressure over time UG.

Otherwise first set signal S1 is reset. Maximum modeled variation of intake manifold pressure over time OG and the measured signal for intake manifold pressure ps are supplied to a second comparator unit 35. Second comparator unit 35 outputs, at its output, a second set signal S2, which remains set for as long as the measured signal for intake manifold pressure ps is greater than the maximum modeled variation of intake manifold pressure over time OG, and otherwise it is reset. First set signal S1 and second set signal S2 are supplied to an OR element 45, whose output is set as long as at least one of its two input signals S1 and S2 is set, and whose output signal is otherwise reset. The output signal of OR element 45 is denoted in FIG. 2 as resulting set signal S.

In order to perform a cylinder-individual evaluation, a cylinder selection unit 90 is provided, which selects for which cylinder of internal combustion engine 1 the above-described evaluation is to be performed. The corresponding number of this cylinder is supplied to an activation unit 95, which also receives a signal of a crankshaft angle transducer. The signal of the crankshaft angle transducer is labeled KW in FIG. 2. Rotational angle sensor 75 may be designed as a crankshaft angle transducer, which, on the one hand, delivers, to engine controller 25, both the position of the crankshaft in the form of crankshaft angle KW and the differentiation over time of this signal as engine speed n of the internal combustion engine. Activation unit 95 then activates first comparator unit 30 and second comparator unit 35 only for the currently ascertained crankshaft angle KW for which reference signal 120 has a wave peak for the cylinder which is to be diagnosed with respect to the operation of its intake and/or exhaust valves. Only in the activated state may first comparator unit 30 and second comparator unit 35 output a set signal at their outputs; in the deactivated state both output a reset signal. The signal of cylinder selection unit 90 is also supplied to a first detection unit 50 and a second detection unit 55. In addition, the resulting set signal S of OR element 45 is also supplied to first detection unit 50. First detection unit 50 includes a time element whose output is set only when the resulting set signal S is applied to the input for at least a predefined time which corresponds to the time constant of the time element of first detection unit 50. Furthermore, first detection unit 50 assigns the resulting set signal S to the cylinder to be evaluated according to cylinder selection unit 90. Depending on the cylinder to be evaluated, output signal F1 of first detection unit 50 may then assume a different level in the set state. It may thus be recognized, on the basis of the set output signal F1 of first detection unit 50, in which cylinder the operation of the intake and/or exhaust valves is erroneous. If the resulting set signal S is applied to the output of first detection unit 50 for less than the predefined time period, output signal F1 of first detection unit 50 is not set and no error of the intake and/or exhaust valves of the cylinder in question is thus recognized.

The resulting set signal S is also supplied to an error counter 100. This error counter 100 is set to 0, in a way not depicted in FIG. 2, at the beginning of the evaluation and is incremented by 1 with each rising edge of the resulting set signal S. Thus, whenever the output signal of OR element 45 changes from the reset state to the set state, error counter 100 is incremented by 1. This occurs independently of whether the resulting set signal S is applied for at least the predefined time period. Count ZS of error counter 100 is supplied to second detection unit 55, which also receives a predefined threshold value SW from a threshold value memory 105. Second detection unit 55 checks whether count ZS is greater than or equal to threshold value SW. If this is the case, output signal F2 of second detection unit 55 is set; otherwise it remains reset. The higher the predefined threshold value SW is calibrated, the longer it lasts until the output of second detection unit 55 is set and thus an erroneous operation of the intake and/or exhaust valves of a cylinder is established on the basis of repeated deviations of the measured signal for the intake manifold pressure from reference signal 120 beyond the predefined tolerance band. The higher threshold value SW is selected, the more reliable is the diagnosis performed in this way. Threshold value SW is thus advantageously calibrated, for example on a test bench, in such a way that a compromise between a fastest possible error diagnosis on the one hand and a most reliable error diagnosis on the other hand results for such repetitive errors. Since the cylinder currently selected for diagnosis is also communicated by cylinder selection unit 90 to second detection unit 55, output signal F2 of second detection unit 55, similarly to the output signal of first detection unit 50, may be set to different levels as a function of the cylinder to be diagnosed, each level being associated with a different cylinder.

Predefined threshold value SW is advantageously selected to be greater than 1, so that a repeated deviation of the measured signal for the intake manifold pressure from the reference signal for the intake manifold pressure by more than the predefined tolerance range may be recognized. Error phenomena whose forms change as the measured signal for the intake manifold pressure changes over time are thus also detected with the aid of second detection unit 55, i.e., when a deviation of the measured signal for the intake manifold pressure greater than the predefined tolerance range exists at a certain time but then decays, so that the measured signal for the intake manifold pressure deviates by less than the predefined tolerance range, although an error still exists. Such decaying error phenomena are counted with the aid of error counter 100, so that the measured signal for the intake manifold pressure may be checked for such cyclically decaying error phenomena. In this way, such decaying error phenomena may be distinguished from an arbitrary one-time influence on the measured signal for the intake manifold pressure, for example, due to an interference signal or electrical interference.

As long as both output signal F1 of first detection unit 50 and output signal F2 of second detection unit 55 are reset, an error-free operation of the intake and exhaust valves of the cylinders of internal combustion engine 1 is detected.

Instead of one cylinder, as described above, the evaluation may also detect the erroneous operation of the intake and/or exhaust valves for a plurality of cylinders or even for all cylinders. In this case, cylinder selection unit 90 specifies the corresponding cylinders, and activation unit 95 activates the first comparator unit and second comparator unit 35 for all wave peaks of the reference signal which are associated with the cylinders to be evaluated. An individually assigned set level for output signal F1 of first detection unit 50 and output signal F2 of second detection unit 55 may be provided for any combination of the cylinders to be evaluated.

The tolerance range, i.e., the tolerance band around reference signal 120 in the form of the minimum modeled variation over time of intake manifold pressure UG and the maximum modeled variation over time of intake manifold pressure OG, is calibrated, for example on a test bench, in such a way that the measured signal may exit this tolerance band only when erroneous operation of the intake and/or exhaust valves of at least one cylinder of internal combustion engine 1 exists.

As an alternative to the construction of the function diagram of FIG. 2, instead of the two comparator units 30 and 35, only one of the two comparator units 30, 35, for example first comparator unit 30 or second comparator unit 35, may be provided, so that in this case if the measured signal for the intake manifold pressure variation is below the tolerance range in the case of first comparator unit 30 or above the tolerance range in the case of second comparator unit 35, this may be used for error detection, whereby, on the other hand, the design of the function diagram and thus the complexity of the diagnosis is simplified. If, as in FIG. 2, both comparator units 30, 35 are used as described above, a more precise conclusion regarding the type of the existing defect during the operation of the intake and/or exhaust valves may be drawn due to the check performed on both sides of the tolerance band. For this purpose, signals S1 and S2 may also be supplied directly to first detection unit 50, which is then designed as a table, for example, and sets the level of its output signal F1 differently depending on which of the two signals S1, S2 is set, in order to be able to thus distinguish different error patterns from each other. If the signal is below the tolerance band, the intake manifold pressure is lower than expected, and accordingly the suction is higher than expected. One or more intake valves are therefore further opened (in the case of doubt, fully opened instead of closed) than expected (air passage). If the tolerance band is exceeded, the situation is exactly the opposite. Accordingly, one or more intake valves are closed further than expected (no gas exchange) or the intake valves are in order but the exhaust valves are erroneously closed or only partially open. In a further alternative, instead of the two detection units 50, 55, only first detection unit 50 or only second detection unit 55 may be provided. In the first case, only errors that result in the resulting set signal S being set for at least the predefined time period are detected; in the second case, only the above-described repeated decaying error phenomena are detected.

If only first detection unit 50 is used, only first comparator unit 30 or only second comparator unit 35 may be used instead of both comparator units 30, 35, as described above, so that in this case, the resulting set signal S corresponds to either signal S1 or signal S2.

Figure 3:
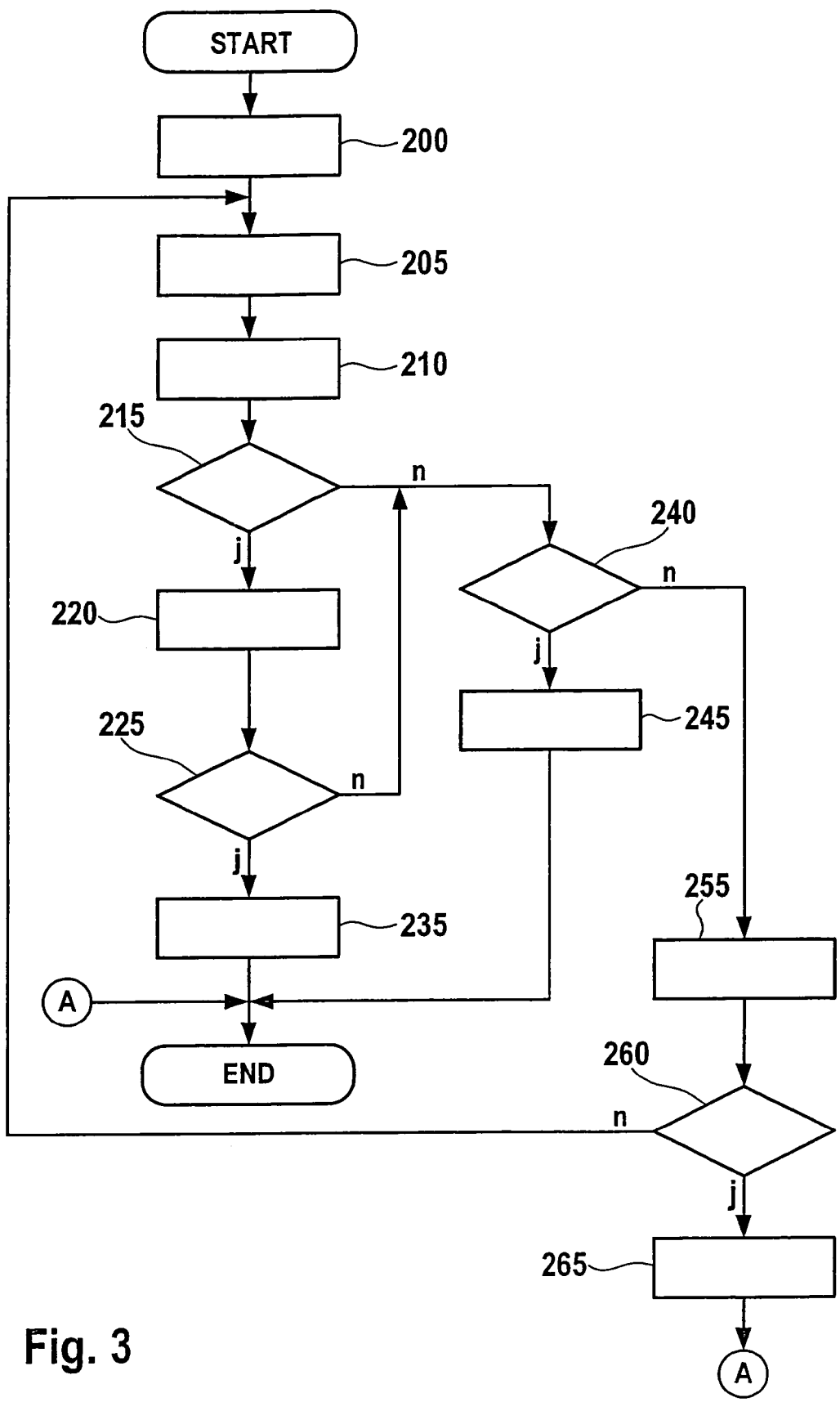
FIG. 3 shows a flow chart for an exemplary sequence of the method according to the example embodiment of the present invention.

FIG. 3 shows a flow chart for an exemplary sequence of the example method according to the present invention. After the start of the program, at a program point 200 the evaluation is started and error counter 100 is set to 0. The program then branches off to program point 205.

At program point 205, reference signal 120 and minimum modeled variation of intake manifold pressure over time UG and maximum modeled variation of intake manifold pressure over time OG are also modeled by selection unit 40 as described above. The program then branches off to program point 210.

At program point 210 the measured signal for intake manifold pressure ps is input. The program then branches off to program point 215.

At program point 215, first comparator unit 30 checks for the crankshaft angles for which it has been activated by activation unit 95 whether the measured signal for intake manifold pressure ps is greater than or equal to the minimum modeled variation of intake manifold pressure over time UG. If this is the case, the program branches off to a program point 220; otherwise first set signal S1 is set and the program branches off to a program point 240.

At program point 220 first set signal S1 is reset if it is not already reset. The program then branches off to program point 225.

At program point 225 second comparator unit 35 checks for the crankshaft angles KW for which it has been activated by activating unit 95 whether the measured signal for intake manifold pressure ps is smaller than or equal to maximum modeled variation of intake manifold pressure over time OG. If this is the case, the program branches off to a program point 235; otherwise second set signal S2 is set and the program branches off to a program point 240.

At program point 235 first set signal S2 is reset if it is not already reset, and thus also the resulting set signal S is reset if it is not already reset, and an error-free operation of the intake and/or exhaust valves of the cylinder(s) in question is recognized. The program is then terminated.

At program point 240, if resulting set signal S is set, first detection unit 50 checks whether the resulting set signal S remains set for at least the predefined time period. If this is the case, the program branches off to a program point 245; otherwise the program branches off to a program point 255.

At program point 245, output signal F1 of first detection unit 50 is set to a level which is provided for the cylinder(s) to be evaluated according to cylinder selection unit 90. The program is then terminated.

At program point 255, error counter 100 is incremented by 1. The program then branches off to program point 260.

At program point 260, second detection unit 55 checks whether count ZS of error counter 100 is greater than or equal to predefined threshold value SW. If this is the case, the program branches off to a program point 265; otherwise the program branches back to program point 205.

At program point 265, second detection unit 55 sets its output signal F2 to a level which is provided for the cylinder (s) to be evaluated according to cylinder selection unit 90. The program is then terminated.

The measured signal for intake manifold pressure ps which is delivered by intake manifold pressure sensor 70 is advantageously processed in a conventional manner, so that the processed signal is in a position to represent the dynamics of the individual suctions by the cylinders. For this purpose, the processed signal should not be excessively dampened so that a wave form may be generated corresponding to reference signal 120. This may be implemented with the aid of a suitable analog pre-filtering of the signal delivered by intake manifold pressure sensor 70, and a suitable sampling rate for sampling the corresponding signal in a conventional manner. Furthermore, the comparison between the appropriately processed measured signal for intake manifold pressure ps and the reference signal or the tolerance band should be performed synchronously with the crankshaft angle, i.e., the signals to be compared should always be associated with the same crankshaft angle at the time of the comparison. Further processing of the measuring signal delivered by intake manifold pressure sensor 70 may involve dampening interference with the measuring signal, for example, by electrical or electromagnetic interference and thus avoiding an erroneous diagnosis.

What is claimed is:

1. A method for monitoring an intake manifold pressure of an internal combustion engine, comprising:
   comparing a measured signal for the intake manifold pressure with a reference signal for the intake manifold pressure;
   checking whether the measured signal for the intake manifold pressure deviates from the reference signal for the intake manifold pressure by more than a predefined tolerance range, the predefined tolerance range being for error-free operation of at least one of intake and exhaust valves of at least one cylinder of the internal combustion engine; and
   detecting an erroneous operation of the at least one of the intake and exhaust valves if the measured signal for the intake monitor deviates from the reference signal for the intake manifold pressure by more than the predefined tolerance range, and if not, detecting an error-free operation of the at least one of the intake and exhaust valves.

2. The method as recited in claim 1, wherein a signal for the intake manifold pressure is ascertained as the reference signal for the intake manifold pressure which is established during steady-state operation of the internal combustion engine at constant load and rotational speed.

3. The method as recited in claim 2, wherein, when ascertaining the reference signal, the intake valves of all cylinders of the internal combustion engine are operated with the same lift and the same phase, and the exhaust valves of all cylinders of the internal combustion engine are operated with the same lift and the same phase.

4. The method as recited in claim 1, wherein the comparing of the measured signal for the intake manifold pressure with the reference signal for the intake manifold pressure is performed individually for each cylinder.

5. The method as recited in claim 4, wherein the comparing of the measured signal for the intake manifold pressure with the reference signal for the intake manifold pressure for a cylinder is allowed only at predefined, angle-synchronous points in time, which permit assigning a signal value of the reference signal to a corresponding cylinder.

6. The method as recited in claim 1, wherein the erroneous operation of the at least one of the intake and exhaust valves of at least one cylinder is detected if the measured signal for the intake manifold pressure exceeds the reference signal for the intake manifold pressure with respect to the at least one cylinder by more than a predefined value as a function of the predefined tolerance range for at least a predefined time period.

7. The method as recited in claim 1, wherein the erroneous operation of the at least one of the intake and exhaust valves of at least one cylinder is detected if the measured signal for the intake manifold pressure is outside a tolerance band formed as a function of the predefined tolerance range around the reference signal for the intake manifold pressure with respect to the at least one cylinder for at least a predefined time period.

8. The method as recited in claim 1, wherein, in the case where the measured signal for the intake manifold pressure deviates from the reference signal for the intake manifold pressure by less than a predefined time period and by more than the predefined tolerance range, the erroneous operation of the at least one of the intake and exhaust valves of the at least one cylinder is detected only if such a deviation with respect to the at least one cylinder is detected repeatedly.

9. The method as recited in claim 1, wherein the reference signal is modeled based on a container model which determines a variation of the intake manifold pressure over time on the basis of mass flows entering the intake manifold via an air supply and exiting the intake manifold into the at least one cylinder by taking into account intake manifold pressure fluctuations caused by suctions of the at least one cylinder.

10. The method as recited in claim 1, wherein, when ascertaining the reference signal, the intake valves of all cylinders of the internal combustion engine are operated with the same lift and the same phase, and the exhaust valves of all cylinders of the internal combustion engine are operated with the same lift and the same phase, wherein the comparing of the measured signal for the intake manifold pressure with the reference signal for the intake manifold pressure is performed individually for each cylinder, and wherein the comparing of the measured signal for the intake manifold pressure with the reference signal for the intake manifold pressure for a cylinder is allowed only at predefined, angle-synchronous points in time, which permit assigning a signal value of the reference signal to a corresponding cylinder.

11. The method as recited in claim 10, wherein the erroneous operation of the at least one of the intake and exhaust valves of at least one cylinder is detected if the measured signal for the intake manifold pressure exceeds the reference signal for the intake manifold pressure with respect to the at least one cylinder by more than a predefined value as a function of the predefined tolerance range for at least a predefined time period.

12. The method as recited in claim 10, wherein the erroneous operation of the at least one of the intake and exhaust valves of at least one cylinder is detected if the measured signal for the intake manifold pressure is outside a tolerance band formed as a function of the predefined tolerance range around the reference signal for the intake manifold pressure with respect to the at least one cylinder for at least a predefined time period.

13. The method as recited in claim 10, wherein, in the case where the measured signal for the intake manifold pressure deviates from the reference signal for the intake manifold pressure by less than a predefined time period and by more than the predefined tolerance range, the erroneous operation of the at least one of the intake and exhaust valves of the at least one cylinder is detected only if such a deviation with respect to the at least one cylinder is detected repeatedly.

14. The method as recited in claim 13, wherein the reference signal is modeled based on a container model which determines a variation of the intake manifold pressure over time on the basis of mass flows entering the intake manifold via an air supply and exiting the intake manifold into the at least one cylinder by taking into account intake manifold pressure fluctuations caused by suctions of the at least one cylinder.

15. A device for monitoring an intake manifold pressure of an internal combustion engine, comprising:
- a comparator adapted to compare a measured signal for the intake manifold pressure with a reference signal for the intake manifold pressure;
- a selection component adapted to, for a deviation of the measured signal for the intake manifold pressure from the reference signal for the intake manifold pressure, predefine a tolerance range for error-free operation of the at least one of the intake and exhaust valves of at least one cylinder of the internal combustion engine;
- a checking component adapted to check whether the measured signal for the intake manifold pressure deviates from the reference signal for the intake manifold pressure by more than the predefined tolerance range; and
- a detector adapted to detect an erroneous operation of the at least one of the intake and exhaust valves if the measured signal for the intake manifold pressure deviates from the reference signal for the intake manifold pressure by more than the predefined tolerance range, and otherwise detect an error-free operation of the at least one of the intake and exhaust valves.

16. The device as recited in claim 15, wherein, when ascertaining the reference signal, the intake valves of all cylinders of the internal combustion engine are operated with the same lift and the same phase, and the exhaust valves of all cylinders of the internal combustion engine are operated with the same lift and the same phase.

17. The device as recited in claim 15, wherein the comparing of the measured signal for the intake manifold pressure with the reference signal for the intake manifold pressure is performed individually for each cylinder.

18. The device as recited in claim 17, wherein the comparing of the measured signal for the intake manifold pressure with the reference signal for the intake manifold pressure for a cylinder is allowed only at predefined, angle-synchronous points in time, which permit assigning a signal value of the reference signal to a corresponding cylinder.

19. The device as recited in claim 15, wherein the erroneous operation of the at least one of the intake and exhaust valves of at least one cylinder is detected if the measured signal for the intake manifold pressure exceeds the reference signal for the intake manifold pressure with respect to the at least one cylinder by more than a predefined value as a function of the predefined tolerance range for at least a predefined time period.

20. The device as recited in claim 15, wherein the erroneous operation of the at least one of the intake and exhaust valves of at least one cylinder is detected if the measured signal for the intake manifold pressure is outside a tolerance band formed as a function of the predefined tolerance range around the reference signal for the intake manifold pressure with respect to the at least one cylinder for at least a predefined time period.

21. The device as recited in claim 15, wherein, in the case where the measured signal for the intake manifold pressure deviates from the reference signal for the intake manifold pressure by less than a predefined time period and by more than the predefined tolerance range, the erroneous operation of the at least one of the intake and exhaust valves of the at least one cylinder is detected only if such a deviation with respect to the at least one cylinder is detected repeatedly.

22. The device as recited in claim 15, wherein the reference signal is modeled based on a container model which determines a variation of the intake manifold pressure over time on the basis of mass flows entering the intake manifold via an air supply and exiting the intake manifold into the at least one cylinder by taking into account intake manifold pressure fluctuations caused by suctions of the at least one cylinder.

23. The device as recited in claim 15, wherein a signal for the intake manifold pressure is ascertained as the reference signal for the intake manifold pressure which is established during steady-state operation of the internal combustion engine at constant load and rotational speed.

* * * * *